W. WHELAN.
VACUUM FAUCET.
APPLICATION FILED AUG. 27, 1909.
958,709.
Patented May 17, 1910.
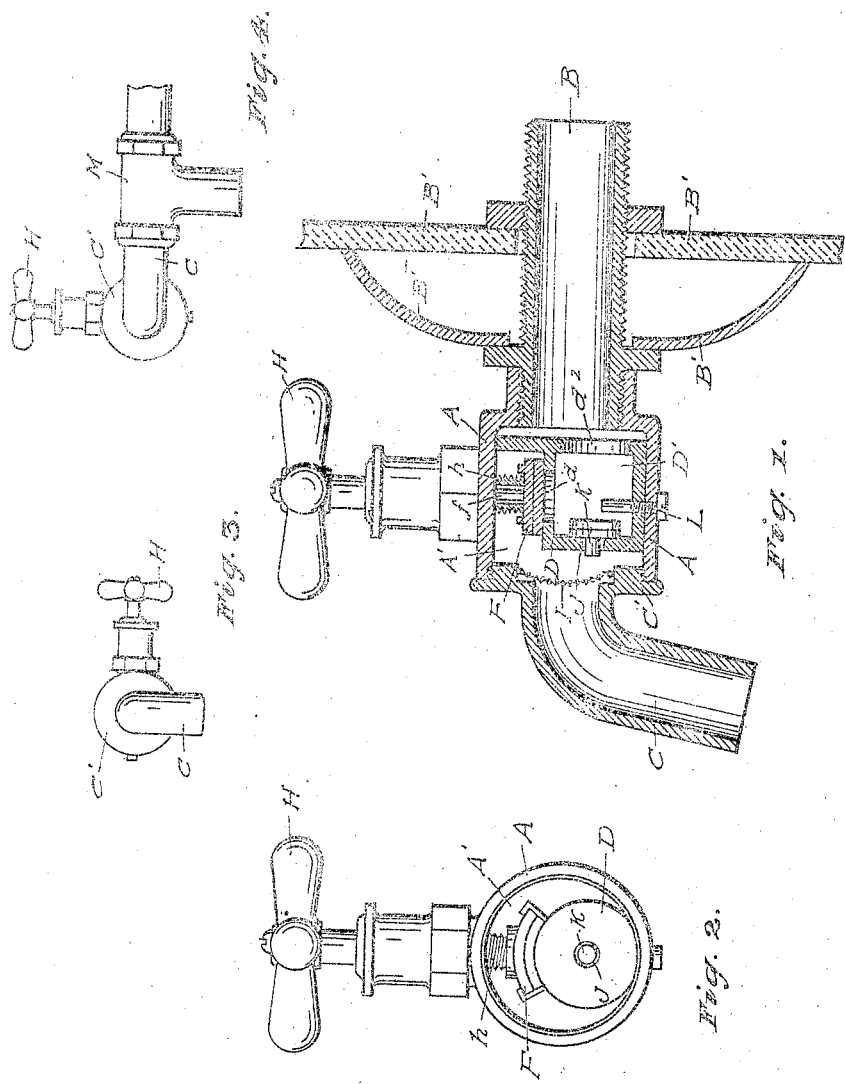
WITNESSES:
A. B. Cornelius
August Worman
INVENTOR:
William Whelan
BY Eugene Ayres,
ATTORNEY.

UNITED STATES PATENT OFFICE.

WILLIAM WHELAN, OF ST. JOSEPH, MISSOURI.

VACUUM-FAUCET.

958,709.     Specification of Letters Patent.     Patented May 17, 1910.

Application filed August 27, 1909. Serial No. 514,921.

*To all whom it may concern:*

Be it known that I, WILLIAM WHELAN, a citizen of the United States, residing at St. Joseph, in the county of Buchanan and State of Missouri, have invented certain new and useful Improvements in Vacuum-Faucets, of which the following is a specification.

The object sought by me in this invention is to provide an improved vacuum faucet for sinks, laundry and bath tubs, and similar use, in which the same valve can be used for both cold and hot water, through which no foreign matter can pass, and that will drain off all water thus obviating the freezing of water in the pipes for different rooms, or apartments, and the bursting of the pipes which frequently occur when water is shut off in main pipe at the stop and waste cock in the cellar or elsewhere.

I accomplish my objects by the mechanism shown in the accompanying drawing in which, Figure 1 is a sectional elevation of the entire device illustrated in connection with a plumbing fixture; Fig. 2 is a front elevation of the same, the nozzle or discharge pipe and screen removed, showing the front and top valves of the pressure chamber; Fig. 3 illustrates an adjustable position of the faucet, and Fig. 4 shows the faucet in a combination connection.

Similar letters refer to similar parts in the several views.

The letter A indicates the wall of an outer valve chamber and A' said chamber.

B is a supply pipe shown in Fig. 1 attached to plumbing fixtures B' B'.

C is the faucet nozzle.

D is the wall of an inner pressure valve chamber and D' is said inner pressure chamber. Said chamber D' is provided with an outlet $d$ in its top through which the passage of water entering said chamber from supply pipe B through opening $d^2$ is regulated by means of a segmental valve F which is seated thereon. This valve is provided with a stem $f$ which projects into the hollow end of a threaded rod $h$ which has connection with a handle H.

The inner wall of nozzle C is provided with a seive or screen I seated therein. Flange C' on nozzle C forms wall of said outer chamber A' and is provided with a threaded shoulder $c$; it is screwed into connection with said wall A by means of said threaded shoulder, as shown in Fig. 1.

When said nozzle is unscrewed said screen may be readily removed, cleansed of any obstruction and replaced. By the use of this screen the water used for culinary or other purposes is kept free from foreign matter and the splashing of water caused by the pressure of air in the nozzle as the water is turned on and the air and water contact and commingle is obviated.

In the front of the inner valve chamber D' there is a vent J. K is a valve with pin which engages with said vent J: when water is in the supply pipe and inner valve chamber, valve K closes vent J by reason of the pressure of water against said valve and its pin, but when the water in the supply pipe is shut off in the main pipe at the stop and waste cock and the pressure of water thereby removed the pressure of air entering said outer chamber A' through nozzle C will gradually force said valve K back into inner chamber D' permitting any water that is in the supply pipe and inner chamber to seep out or evaporate through said vent thus rendering it wholly unnecessary when the water is shut off at the stop cock to go to all apartments and rooms supplied with water by said pipe and open the faucets.

L is a pin for the vent valve and M, Fig. 4, shows a combination coupling for hot and cold water, or other purpose.

What I claim and desire to secure by Letters Patent is,

1. In a combination valve faucet a wall around an outer valve chamber, a nozzle and the threaded flange thereon engaging with said wall and forming the front thereof, a removable screen seated therein, a valve handle and a hollow rod, an inner wall forming a pressure chamber provided with a water outlet at the top, an opening at the rear to receive water from a supply pipe and a vent at the front, a segmental valve, seated on said top water outlet, a stem on said valve projecting into but unattached to the lower end of said rod, a valve and pin seated in said vent and a retaining pin to prevent the displacement of said valve by the pressure of air when the opposite pressure of water is reduced, substantially as described and shown.

2. The combination with a supply pipe, of a T end constituting an outer valve chamber, a valve handle and threaded rod hollow at the bottom, an adjustable nozzle and a flange thereon forming the front of said wall, a removable screen seated in said flanged wall, an inner wall forming a pressure chamber provided with an outlet at the top, an inlet for the supply of water and an opposite vent, a segmental valve seated over said outlet, a valve stem engaging movably with the hollow end of said rod, a valve in said pressure chamber and the pin thereon to engage with said vent, and a pin spaced from said valve to prevent the displacement of said valve when pressed inward by the air when the opposite pressure of water is reduced, substantially as described and shown.

3. The combination in a faucet of outer walls forming an outer chamber and inner walls rigidly attached thereto forming a pressure chamber said chambers having the necessary inlets, outlets and a vent, a segmental valve seated on the outlet for water from the pressure chamber to the outer chamber, a valve vertical within said pressure chamber and a pin thereon engaging with said vent to allow air to enter said pressure chamber when the water pressure on said valve has ceased or been reduced, substantially as described and shown.

4. In a faucet the combination of a T end supply pipe, a flanged nozzle adjustable on the outer T end thereof said T end and flange forming an outer chamber, walls attached on the bottom of said T end said walls provided with a rear inlet and top vent and constituting a pressure chamber, a valve in the front wall of said pressure chamber and means to retain it in position, a segmental valve on said vent, a stem thereon and a threaded handle rod with which said stem engages, substantially as set forth and shown.

5. In a faucet a segment of pipe having a threaded shoulder at the rear end to engage with a supply pipe, a nozzle having a threaded flange to engage with the front end of said pipe said pipe and flange forming a wall for an outer chamber and a removable seive seated in an inner shoulder of said nozzle, substantially as described and shown.

In testimony whereof I affix my signature in presence of two witnesses.

WILLIAM WHELAN.

Witnesses:
  August Worman,
  Roy Willian.